(12) United States Patent
Li et al.

(10) Patent No.: US 8,010,863 B2
(45) Date of Patent: Aug. 30, 2011

(54) METHOD AND APPARATUS FOR SYNCHRONIZING MULTIPLE MULTIMEDIA STREAMS

(75) Inventors: Dekai Li, Yardley, PA (US); Saurabh Mathur, Monmouth Junction, NJ (US); Ashwin Kashyap, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1070 days.

(21) Appl. No.: 11/880,729

(22) Filed: Jul. 24, 2007

(65) Prior Publication Data

US 2008/0028276 A1 Jan. 31, 2008

Related U.S. Application Data

(60) Provisional application No. 60/834,058, filed on Jul. 28, 2006.

(51) Int. Cl.
*H03M 13/00* (2006.01)

(52) U.S. Cl. ........................................................ 714/752

(58) Field of Classification Search ................... 714/752
See application file for complete search history.

(56) References Cited

U.S. PATENT DOCUMENTS

| | | | |
|---|---|---|---|
| 6,141,788 A * | 10/2000 | Rosenberg et al. | 714/774 |
| 7,779,336 B2 * | 8/2010 | Wenger et al. | 714/776 |
| 2010/0023525 A1 * | 1/2010 | Westerlund et al. | 707/10 |
| 2010/0050057 A1 * | 2/2010 | Luby | 714/776 |

* cited by examiner

*Primary Examiner* — Scott Baderman
*Assistant Examiner* — Enam Ahmed
(74) *Attorney, Agent, or Firm* — Robert D. Shedd; Paul P. Kiel; Guy H. Eriksen

(57) ABSTRACT

There are provided a method and apparatus for synchronizing a plurality of media streams that use Forward Error Correction. The apparatus includes a memory device (110), a FEC encoder (120), and a control device (140). The memory device (110) is for buffering the plurality of media streams. The FEC encoder (120) is for generating FEC packets for streams. The control device (140) is for determining, for each stream, a respective threshold amount of buffer to be filled in order to initiate generation of the corresponding FEC packets, and upon a fastest one of the streams filling the respective threshold amount of buffer, causing an initiation of the generation of the FEC packets for the fastest stream, as well as for the other streams, irrespective of a current fill amount of the other streams, wherein said control device causes the initiation of the generation of the FEC packets by the FEC encoder via signaling.

15 Claims, 3 Drawing Sheets

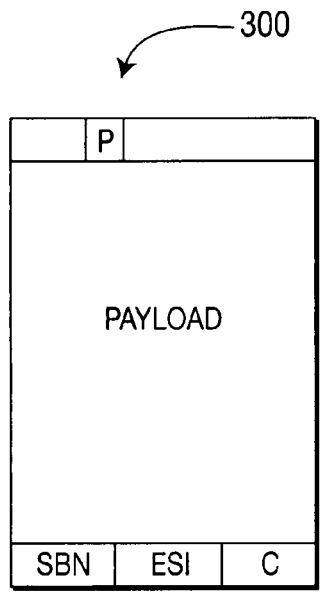
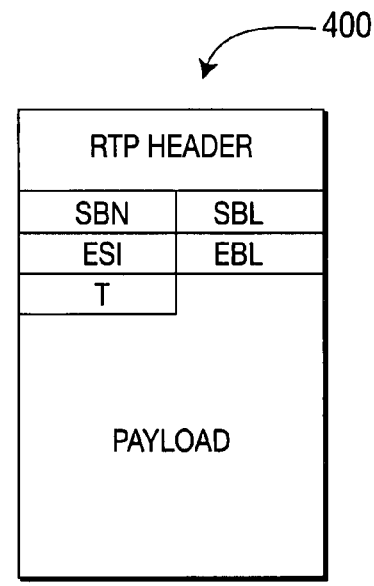
FIG. 3    FIG. 4
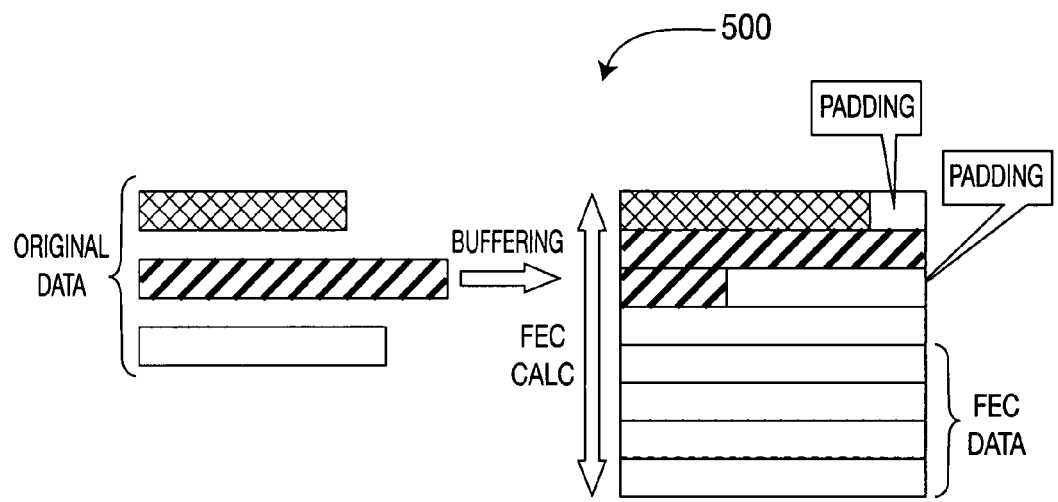
FIG. 5

METHOD AND APPARATUS FOR SYNCHRONIZING MULTIPLE MULTIMEDIA STREAMS

CROSS-REFERENCE TO RELATED APPLICATIONS

This application claims the benefit of U.S. Provisional Application Ser. No. 60/834,058, filed 28 Jul. 2006, which is incorporated by reference herein in its entirety.

TECHNICAL FIELD

The present principles relate generally to video encoding and decoding and, more particularly, to a method and apparatus for synchronizing multiple multimedia streams.

BACKGROUND

When streaming multimedia content in an error-prone network environment (e.g., a wireless network), using unicast, multicast or broadcast, Forward Error Correction (FEC) is often used to recover lost packets due to transmission error/loss. In order to recover burst packet loss, Forward Error Correction works on a number of packets. This involves buffering the packets before FEC redundant packets can be generated. These redundant packets, due to buffering, are generated with a delay relative to the first protected data packet. To recover time-constrained data packets, these delayed redundant packets must also be received in time. The delay is dependent upon the amount of buffering. A multimedia content usually includes several synchronized streams and the streaming server initially sends out synchronized streams regardless of whether Forward Error Correction is used or not. If the buffering is not chosen properly for these streams, then different delays of the Forward Error Correction packets will be introduced, resulting in different Forward Error Correction decoding delays for different streams. This further causes unsynchronized media decoding.

To illustrate this problem, consider a streaming session with two synchronized streams, one for video, and the other for audio. Suppose the packet rate is $P_v$ packets per second for video and $P_a$ packets per second for audio. To calculate the Forward Error Correction to be used, we use $K_v$ packets buffered for video data and $K_a$ packets buffered for audio data. In order to minimize the delay in the Forward Error Correction calculation, for each packet, we make a copy for calculation and immediately send it out. When we have enough data, i.e., $K_v$ packets for video and $K_a$ packets for audio, we start generating redundant packets. Thus, the minimum delays from transmission of the first data packets and transmission of the first redundant packets are as follows:

$$D_v = K_v / P_v$$

$$D_a = K_a / P_a$$

Typically, there is a lower data rate for audio than for video, $P_v > P_a$. If we use the same amount of buffer for both video and audio, i.e., $K_v = K_a$, the latency of a redundant packet for audio will be larger than for video, $D_a > D_v$. If the conditions of the network over which the streams are transmitted are good and there is no packet loss, redundant packets are not used. Both video and audio packets can still be processed in synchronization as if there were no Forward Error Correction. If there is some packet loss, the recovery process requires timely arrival of some redundant packets. On the client side, suppose the buffer time for Forward Error Correction decoding is T, which is the same for both audio and video. For Forward Error Correction decoding, T should be larger than at least one block of media data. If the video data rate is much greater than the audio data rate (an example being in the case of high definition content), then $D_v \ll D_a$. If the client chooses a buffer time T such that $D_v < T < D_a$, then audio data recovery will fall behind video data recovery, resulting in either delayed audio decoding or a lossy audio stream.

One possible solution is to tune the buffer size for both video and audio to make $D_v$ and $D_a$ roughly equal. However, if the content is encoded using VBR (variable bit rate), it is difficult to specify the correct buffer size at the beginning.

Previously, the International Organization for Standardization/International Electrotechnical Commission (ISO/IEC) Moving Picture Experts Group-2 (MPEG-2) standard Transport Stream put multiple elementary streams in the same MPEG-2 transport multiplex. Through the use of a Program Identifier (PID), each packet is associated with a Packetized Elementary Stream (PES). Thus, synchronization is done within the same stream. However, no solution has been found to solve this synchronization problem when multiple, separate streams are used in a streaming session in which Forward Error Correction is enabled.

SUMMARY

These and other drawbacks and disadvantages of the prior art are addressed by the present principles, which are directed to a method and apparatus for synchronizing multiple multimedia streams.

According to an aspect of the present principles, there is provided a method for synchronizing a plurality of media streams that use Forward Error Correction. The method includes, for each of the plurality of media streams, specifying a respective threshold amount of buffer to be filled in order to initiate generation of corresponding Forward Error Correction packets. Upon a fastest one of the plurality of media streams filling the respective threshold amount of buffer, initiating generation of the Forward Error Correction packets for the fastest one of the plurality of media streams, as well as for other ones of the plurality of media streams, irrespective of a current fill amount of the other ones of the plurality of media streams.

According to another aspect of the present principles, there is provided an apparatus for synchronizing a plurality of media streams that use Forward Error Correction. The apparatus includes a memory device, a Forward Error Correction (FEC) encoder, and a control device. The memory device is for buffering the plurality of media streams. The FEC encoder is for generating Forward Error Correction packets for the plurality of media streams. The control device is for determining, for each of the plurality of media streams, a respective threshold amount of buffer to be filled in order to initiate generation of the corresponding Forward Error Correction packets, and upon a fastest one of the plurality of media streams filling the respective threshold amount of buffer, causing an initiation of the generation of the Forward Error Correction packets for the fastest one of the plurality of media streams, as well as for other ones of the plurality of media streams, irrespective of a current fill amount of the other ones of the plurality of media streams, wherein said control device causes the initiation of the generation of the Forward Error Correction packets by the Forward Error Correction encoder via signaling.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 3 is diagram for an exemplary format for Real-time Transport Protocol (RTP) packets, in accordance with an embodiment of the present principles;

FIG. 4 is a diagram for an exemplary format for Forward Error Correction (FEC) packets, in accordance with an embodiment of the present principles;

FIG. 5 is a diagram for an exemplary buffering of packets for Forward Error Correction (FEC) calculation, in accordance with an embodiment of the present principles.

DETAILED DESCRIPTION

Figure 1:
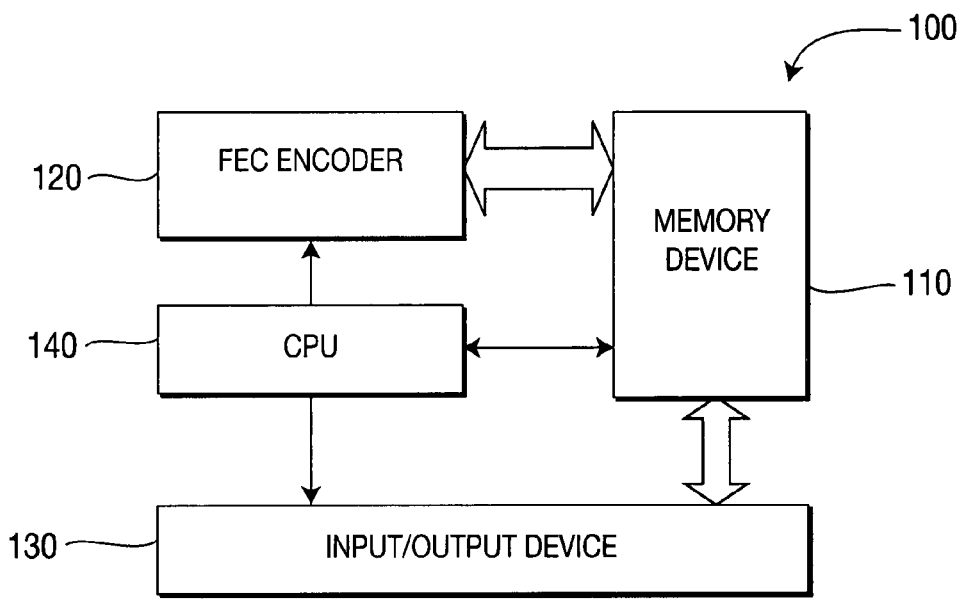
FIG. 1 is a block diagram for an exemplary Forward Error Correction (FEC) packet generator with stream synchronization for multiple FEC protected streams, in accordance with an embodiment of the present principles.

The present principles are directed to a method and apparatus for synchronization of multiple multimedia streams.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary Forward Error Correction (FEC) packet generator with stream synchronization for multiple FEC protected streams is indicated generally by the reference numeral 100. The FEC packet generator 100 includes a memory device 110 having a first bidirectional input/output connected in signal communication with a bi-directional input/output of a Forward Error Correction (FEC) encoder 120, a second bi-directional input/output connected in signal communication with a bi-directional input/output of an input/output device 130, and third bi-directional input/output connected in signal communication with a bi-directional input/output of a Central Processing Unit (CPU) 140. A first output of the CPU 140 is connected in signal communication with an input of the FEC encoder 120, and a second output of the CPU 140 is connected in signal communication with an input of the input/output device 130.

The CPU 140 executes a program stored in the memory device 110 and controls the other elements. The input/output device 130 receives packets and stores them in the memory device 110. When there are enough packets, the CPU 140 controls the FEC encoder 120 to generate redundant packets (the FEC packets) which are also stored in the memory device 110. The CPU 140 controls the input/output device 130 to send out the generated redundant packets. The input/output device 130 can be, for example, a network interface that receives data and sends redundant packets. It is to be appreciated that while the memory device 110 is shown as a single element, it may be shared by multiple streams, each having its own buffer within the memory device 110.

Figure 2:
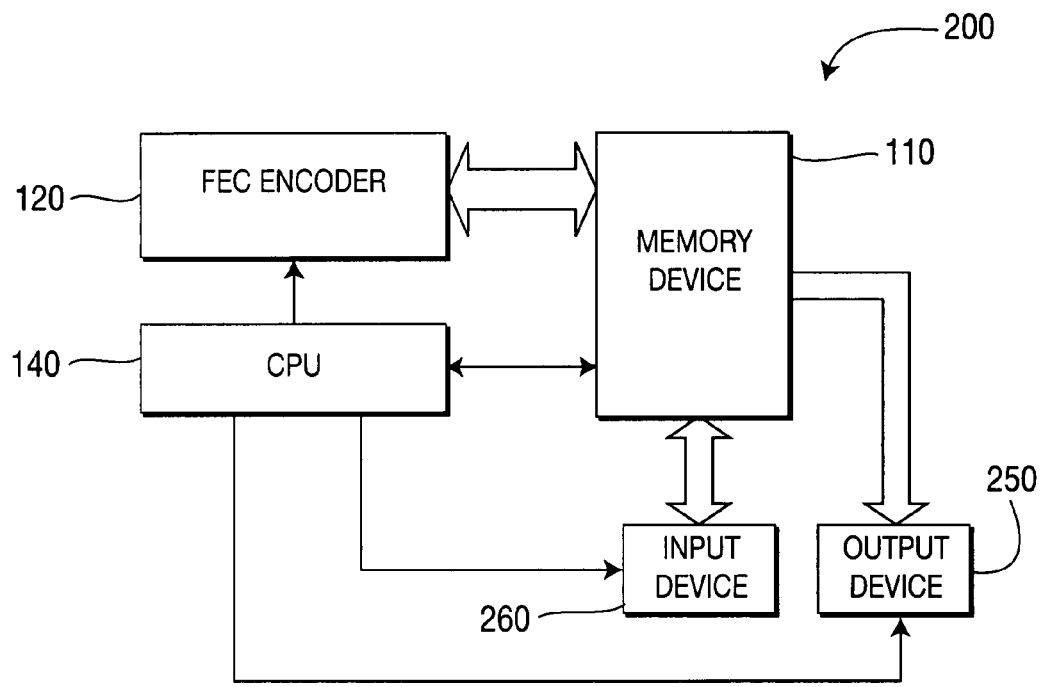
FIG. 2 is a block diagram for an exemplary Forward Error Correction (FEC) packet generator with stream synchronization for multiple FEC protected streams, in accordance with an embodiment of the present principles.

Turning to FIG. 2, another exemplary Forward Error Correction (FEC) packet generator with stream synchronization for multiple FEC protected streams is indicated generally by the reference numeral 200. The FEC packet generator 200 includes a memory device 110 having a first bidirectional input/output connected in signal communication with a bi-directional input/output of a Forward Error Correction (FEC) encoder 120, a second bi-directional input/output connected in signal communication with a bi-directional input/output of a Central Processing Unit (CPU) 140, an output connected in signal communication with an input of an output device 250, and an input connected in signal communication with an output of an input device 260. A first output of the CPU 140 is connected in signal communication with an input of the FEC encoder 120, a second output of the CPU 140 is connected in signal communication with an input of the input device 260, and a third output of the CPU 140 is connected in signal communication with an input of the output device 250.

The FEC packet generator 200 of FIG. 2 differs from the FEC packet generator 100 of FIG. 1 in that the FEC packet generator 200 uses separate devices for input and output, as represented by input device 260 and output device 250, respectively, as compared to the single input/output device 130 of FIG. 1. In such a case, the input device 260 may be an independent network interface or inter-process communication channel (in this case, data packets may be from a local process such as, for example, a streaming program). Moreover, the output device 250 may be, for example, a network interface.

The memory device 110 may be partitioned into one or more distinct buffer regions for respectively storing the streams to be synchronized. Moreover, such partitioning may be initiated by the CPU 140. Alternatively, a non-partitioned memory space may be collectively used for all of the streams. Of course, the present principles are not limited to the preceding described implementations and configurations of the memory device 110. Given the teachings of the present principles provided herein, one of ordinary skill in this and related arts will contemplate these and various other implementations and configurations of the memory device 110, while maintaining the spirit of the present principles.

In FIGS. 1 and 2, the larger sized arrows indicate data and/or redundant packets, and the smaller sized arrows indicate control signals.

It is to be appreciated that the preceding elements and arrangements thereof as shown in FIGS. 1 and 2 are merely illustrative and, thus, one of ordinary skill in this and related arts will contemplate these and other elements and arrangements thereof for use in accordance with the present principles, while maintaining the spirit of the present principles. For example, bi-directional input/outputs may be replaced by dedicated input lines and output lines, and so forth. Further, each stream may be stored on its own separate memory device. Thus, it is to be appreciated that, given the teachings of the present principles provided herein, the present principles are not limited solely to the elements and arrangements as shown herein, but rather may be extended and/or modified as readily determined by one of ordinary skill in this and related arts while maintaining the spirit of the present principles.

As noted above, the present principles are directed to a method and apparatus for synchronizing multiple multimedia streams. Embodiments of the present principles involve the streaming of multimedia content with Forward Error Correction (FEC) enabled.

To solve the synchronization problem described above with respect to multiple multimedia streams with Forward Error Correction enabled, an issue is to choose the correct buffer size K depending on the packet rate. However, a stream may have a variable bit rate (VBR), resulting in a different D with a given buffer. Even for a constant bit rate stream, different packetization schemes might result in different packet rates. Therefore, it is not easy to specify the buffer size a priori.

Therefore, in accordance with an embodiment, a "push" mechanism is disclosed to choose K dynamically when multiple streams are involved in a session. For each stream, we specify the maximum amount of buffer for Forward Error Correction calculation. When the fastest stream fills its buffer, it starts generating redundant packets. At the same time, it sends a "push" message to the other streams which require synchronization. Upon receiving this message, the other streams stop waiting for more data to fill their buffer and also start generating Forward Error Correction packets based on what is already buffered, equivalent to choosing a smaller K. This mechanism results in the same D for all participating streams, even when a variable bit rate is used. The message used for notifying other streams can be implemented using one or more of the different approaches disclosed herein including, but not limited to, e.g., a function call, message passing, and so forth, as is readily contemplated by one of ordinary skill in this and related arts.

To demonstrate the effectiveness of this solution, we chose to implement the synchronization mechanism in FIREFLO, an extensible, efficient, and portable streaming server. To date, we have implemented two Forward Error Correction schemes based on this mechanism: Reed Solomon Code and Raptor Code. Of course, the present principles are not limited to solely these two FEC schemes and, given the teachings of the present principles provided herein, one of ordinary skill in this and related arts will contemplate these and various other Forward Error Correction schemes to which the present principles may be applied, while maintaining the spirit of the present principles. Due to the dynamics of the buffer size K, the first issue is the reliable communication of K and the amount of redundant packets to the client side. This can be done using Transmission Control Protocol (TCP). However, this uses a separate signaling connection between the sender and the receiver. In order to remain compatible with existing clients, we chose to transmit this information also using User Datagram Protocol (UDP). Since we are focused mostly on Real-time Transport Protocol (RTP), which is based on UDP, a datagram protocol susceptible to packet loss and out-of-order delivery, we must guarantee that the client has enough information for FEC decoding.

In an embodiment, we follow the 3rd Generation Partnership Project (3GPP) packet format to maintain compatibility. Of course, the present principles are not limited solely to the 3GPP packet format and, thus, other packets formats may also be used, as readily contemplated by one of ordinary skill in this and related arts, while maintaining the spirit of the present principles.

Turning to FIG. 3, an exemplary format for Real-time Transport Protocol (RTP) packets is indicated generally by the reference numeral 300. The RTP packet format 300 includes a Payload field, a P field, a SBN field, an ESI field, and a C field.

Turning to FIG. 4, an exemplary format for Forward Error Correction (FEC) packets is indicated generally by the reference numeral 400. The FEC packet format includes a payload field, an RTP header field, a SBN field, a SBL field, an ESI field, an EBL field, and a T field.

In FIGS. 3 and 4, the SBN field denotes the block this packet belongs to, the P field denotes a value of a padding bit, the ESI field denotes its location in this block, and the C field denotes the number of padding bytes in the packet. In FIG. 4, the SBL field denotes the value of K, the EBL field denotes the total amount of data (including redundant packets), and the T field denotes the symbol size for Forward Error Correction decoding.

For every RTP packet 300, we need to know which Forward Error Correction block it belongs to and its position within that block. We made use of the RTP padding to append this information at the end of every packet. For every RTP packet, if the padding bit P is not set, we set it to one and append five bytes to the packet. In this case, the field C will be 5. If the padding bit is already set, we either increase it or reuse it. If the padding is less than five, we increase the padding by four to account for the additional information, SBN and ESI. We also update C by adding four to it. If the padding plus 4 is greater than 255, the maximum value for C, we reuse the last 5 bytes for SBN and ESI.

The Forward Error Correction packet needs to carry more information for decoding. Turning to FIG. 5, an exemplary buffering of packets for Forward Error Correction (FEC) calculation is indicated generally by the reference numeral 500.

As shown in FIG. 5, we perform Forward Error Correction calculation by first buffering the packets into a buffer. If a packet is shorter than the length of a row, we pad the rest with zero. If a packet is longer than a row, we wrap it into several rows and also perform padding. When we have enough packets buffered, we perform Forward Error Correction encoding and packetize the Forward Error Correction data to send it out.

The "push" message is implemented using a callback function. When the fastest stream fills its buffer, it calls a function that has access to all the streams. This callback function then notifies each of the other streams to start generating Forward Error Correction packets. For each protected stream, we specify an overhead, which, based on K, generates the amount of redundant packets.

We calculate the Forward Error Correction overhead based on the following formulas:

Overhead: $O=(N-K)/K$

Total packets: $N=K*(O+1)$

FEC packets: $N-K=K*O$

This may be a problem when multiple streams of a session are encoded using a variable bit rate, e.g., two video streams with the same average bit rate. At a given time, one of the streams may have a higher bit rate than the other stream, but at another time it has a lower bit rate than the other stream. If a stream is pushed by a faster stream, then Forward Error Correction data will be generated based on the currently buffered data K', which is less than the specified amount K. This results in less Forward Error Correction data (N-K) if we maintain the same overhead, leading to weaker protection in the case of burst loss. We presume that the total amount of packets, data packets and Forward Error Correction packets, can be supported by the underlying network. Thus, we can maintain the same level of protection by increasing the Forward Error Correction overhead. This can be done by generating the Forward Error Correction data based on the expected K, instead of the smaller K'.

$N'=K'+K*O$

The total amount of packets N', is still less than N, without exceeding the bandwidth requirement for the original streams.

Figure 6:
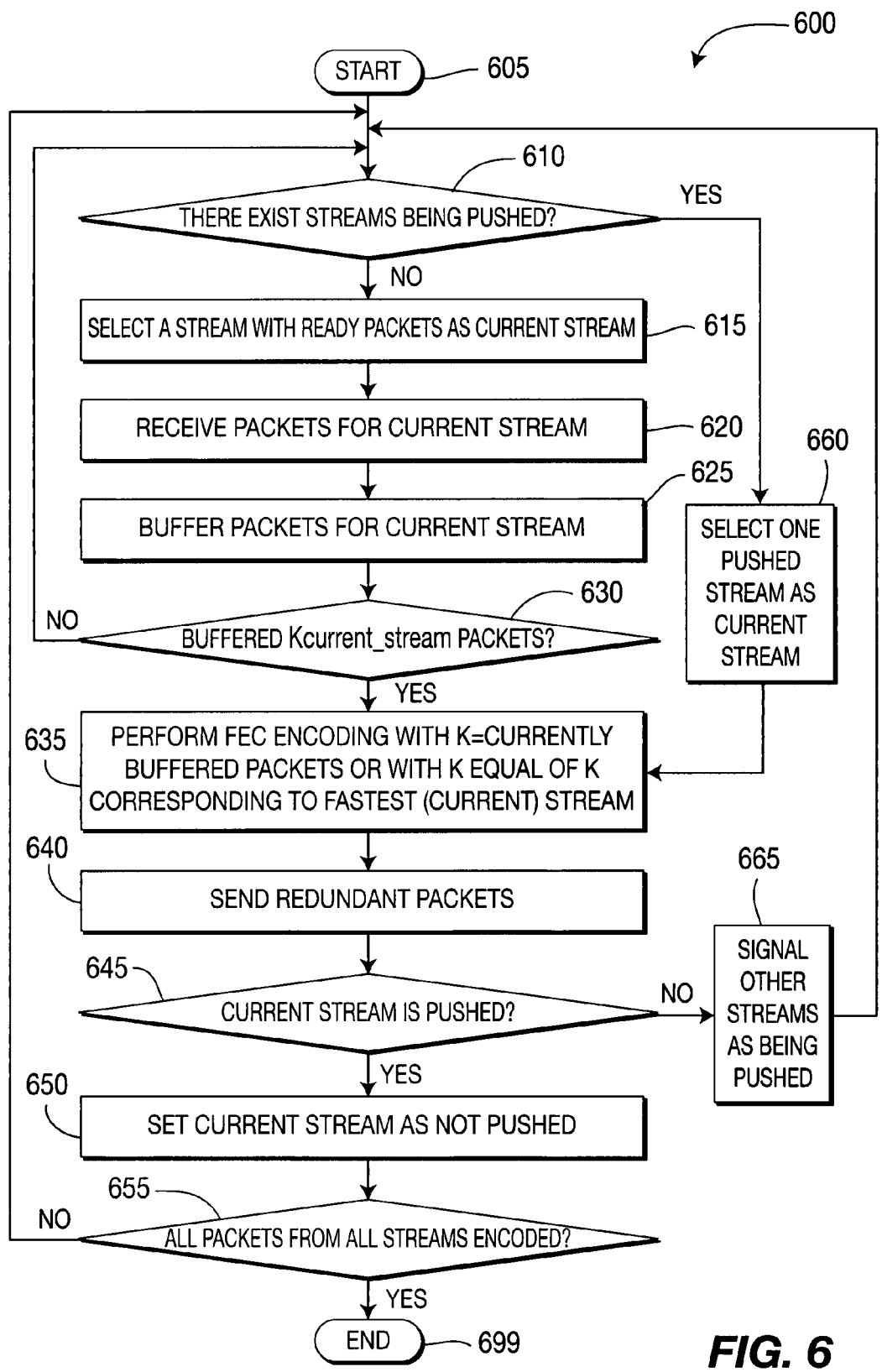
FIG. 6 is a flow diagram for an exemplary method for synchronizing Forward Error Correction (FEC) protected media streams, in accordance with an embodiment of the present principles.

Turning to FIG. 6, an exemplary method for synchronizing Forward Error Correction (FEC) protected media streams is indicated generally by the reference numeral 600. The method 600 includes a start block 605 that passes control to a decision block 610. The decision block 610 determines whether or not there exist any streams being "pushed". If so, then control is passed to a function block 660. Otherwise, control is passed to a function block 615.

The function block 660 selects one pushed stream as the current stream, and passes control to a function block 635. The function block 635 performs Forward Error Correction (FEC) encoding for the current stream using a variable K set equal to an amount of currently buffered packets for the current stream (for example, in the case of a constant bit rate across the streams) or with the variable K equal to the value of K corresponding to the fastest stream (for example, in the case of a variable bit rate across the streams), and passes control to a function block 640. The function block 640 sends redundant packets corresponding to the current stream, and passes control to a decision block 645. The decision block 645 determines whether or not the current stream is pushed. If so, then control is passed to a function block 650. Otherwise, control is passed to a function block 665.

The function block 650 marks the current stream as not pushed, and passes control to a decision block 655. The decision block 655 determines whether or not all packets for all of the streams to be synchronized have been encoded. If so, then control is passed to an end block 699. Otherwise, control is returned to the decision block 610.

The function block 615 selects a stream with ready packets as the current stream, and passes control to a function block 620. The function block 620 receives packets for the current stream, and passes control to a function block 625. The function block 625 buffers packets for the current stream, and passes control to a decision block 630. The decision block 630 determines whether or not K packets have been buffered for the current stream. If so, then control is passed to the function block 635. Otherwise, control is returned to the function block 610.

The function block 665 signals the other streams that are to be synchronized with the current stream as pushed, and returns control to the decision block 610.

A description will now be given of some of the many attendant advantages/features of the present invention, some of which have been mentioned above. For example, one advantage/feature is an apparatus for synchronizing a plurality of media streams that use Forward Error Correction. The apparatus includes a memory device, a Forward Error Correction (FEC) encoder, and a control device. The memory device is for buffering the plurality of media streams. The Forward Error Correction encoder is for generating Forward Error Correction packets for the plurality of media streams. The control device is for determining, for each of the plurality of media streams, a respective threshold amount of buffer to be filled in order to initiate generation of the corresponding Forward Error Correction packets, and upon a fastest one of the plurality of media streams filling the respective threshold amount of buffer, causing an initiation of the generation of the Forward Error Correction packets for the fastest one of the plurality of media streams, as well as for other ones of the plurality of media streams, irrespective of a current fill amount of the other ones of the plurality of media streams, wherein said control device causes the initiation of the generation of the Forward Error Correction packets by the Forward Error Correction encoder via signaling.

Another advantage/feature is the apparatus as described above, wherein the control device signals the Forward Error Correction encoder using at least one of a message and a function call.

Yet another advantage/feature is the apparatus as described above, wherein an amount of the Forward Error Correction packets generated is governed by a threshold.

Moreover, another advantage/feature is the apparatus as described above, wherein an amount of the Forward Error Correction Packets generated by said Forward Error Correction encoder for the other ones of the plurality of media streams is based upon the respective threshold amount of buffer, irrespective of the current level of fill respectively corresponding thereto, when the bit rate for the plurality of streams is variable.

Further, another advantage/feature is the apparatus as described above, herein the respective threshold amount of buffer is determined dynamically.

Also, another advantage/feature is the apparatus as described above, wherein the respective threshold amount of buffer corresponds to a respective maximum amount of buffer to be filled.

Additionally, another advantage/feature is the apparatus as described above, wherein the memory device comprises a plurality of buffer elements, each corresponding to a respective one of the plurality of media streams.

Moreover, another advantage/feature is the apparatus as described above, wherein a size of each of the plurality of buffer elements is dynamically determined by the control device.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A method for synchronizing a plurality of media streams that use Forward Error Correction, comprising:
    for each of the plurality of media streams, specifying (630) a respective threshold amount of buffer to be filled in order to initiate generation of corresponding Forward Error Correction packets; and
    upon a fastest one of the plurality of media streams filling the respective threshold amount of buffer, initiating (635) generation of the Forward Error Correction packets for the fastest one of the plurality of media streams, as well as for other ones of the plurality of media streams, irrespective of a current fill amount of the other ones of the plurality of media streams.

2. The method of claim 1, further comprising:
    signaling (665) to cause the other ones of the plurality of media streams to initiate the generation of the Forward Error Correction packets there for, upon the fastest one of the plurality of media streams filling the respective threshold amount of buffer.

3. The method of claim 2, wherein said signaling step (665) comprises generating at least one of a message and a function call.

4. The method of claim 1, wherein an amount of the Forward Error Correction packets generated is governed by a threshold.

5. The method of claim 1, wherein an amount of the Forward Error Correction Packets generated for the other ones of the plurality of media streams is based upon the respective threshold amount of buffer, irrespective of the current level of fill respectively corresponding thereto, when the bit rate for the plurality of streams is variable.

6. The method of claim 1, wherein the respective threshold amount of buffer is determined dynamically.

7. The method of claim 1, wherein the respective threshold amount of buffer corresponds to a respective maximum amount of buffer to be filled.

8. An apparatus for synchronizing a plurality of media streams that use Forward Error Correction, comprising:
    a memory device (110) for buffering the plurality of media streams;
    a Forward Error Correction encoder (120) for generating Forward Error Correction packets for the plurality of media streams; and
    a control device (140) for determining, for each of the plurality of media streams, a respective threshold amount of buffer to be filled in order to initiate generation of the corresponding Forward Error Correction packets, and upon a fastest one of the plurality of media streams filling the respective threshold amount of buffer, causing an initiation of the generation of the Forward Error Correction packets for the fastest one of the plurality of media streams, as well as for other ones of the plurality of media streams, irrespective of a current fill amount of the other ones of the plurality of media streams, wherein said control device causes the initiation of the generation of the Forward Error Correction packets by the Forward Error Correction encoder via signaling.

9. The apparatus of claim 8, wherein said control device (140) signals the Forward Error Correction encoder using at least one of a message and a function call.

10. The apparatus of claim 8, wherein an amount of the Forward Error Correction packets generated is governed by a threshold.

11. The apparatus of claim 8, wherein an amount of the Forward Error Correction Packets generated by said Forward Error Correction encoder (120) for the other ones of the plurality of media streams is based upon the respective threshold amount of buffer, irrespective of the current level of fill respectively corresponding thereto, when the bit rate for the plurality of streams is variable.

12. The apparatus of claim 8, wherein the respective threshold amount of buffer is determined dynamically.

13. The apparatus of claim 8, wherein the respective threshold amount of buffer corresponds to a respective maximum amount of buffer to be filled.

14. The apparatus of claim 8, wherein said memory device (110) comprises a plurality of buffer elements, each corresponding to a respective one of the plurality of media streams.

15. The apparatus of claim 14, wherein a size of each of the plurality of buffer elements is dynamically determined by said control device (140).

* * * * *